United States Patent
Otto et al.

(10) Patent No.: US 8,401,745 B2
(45) Date of Patent: Mar. 19, 2013

(54) PRESSURE CONTROL SYSTEM FOR A HYDRAULIC LIFT AND FLOTATION SYSTEM

(75) Inventors: Douglas R. Otto, Ephrata, PA (US); Robert L. Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 608 days.

(21) Appl. No.: 12/551,697

(22) Filed: Sep. 1, 2009

(65) Prior Publication Data
US 2011/0047946 A1    Mar. 3, 2011

(51) Int. Cl.
*G06F 19/00* (2006.01)
(52) U.S. Cl. .......................................... 701/50
(58) Field of Classification Search ............ 56/10.9, 56/11.9, 15.8, 15.6, 10.8, 208, 209, 10.2 A–10.2 E; 60/327, 468, 469, 421, 422; 91/432, 516, 91/517; 172/2–11, 260.4, 260.5, 464; 701/50
See application file for complete search history.

(56) References Cited

U.S. PATENT DOCUMENTS

| | | | |
|---|---|---|---|
| 4,373,697 A | 2/1983 | Phelps | |
| 4,655,039 A | 4/1987 | McCabe et al. | |
| 4,766,921 A | 8/1988 | Williams | |
| 4,813,339 A | 3/1989 | Uno et al. | |
| 4,817,499 A | 4/1989 | Bellanger et al. | |
| 4,909,279 A | 3/1990 | Nakamura et al. | |
| 5,056,312 A * | 10/1991 | Hirata et al. | 60/426 |
| 5,202,813 A | 4/1993 | Uota et al. | |
| 5,645,097 A | 7/1997 | Zechmann et al. | |
| 5,647,387 A | 7/1997 | Tsutsui | |
| 5,704,200 A | 1/1998 | Chmielewski, Jr. et al. | |
| 5,813,312 A * | 9/1998 | Arai et al. | 91/516 |
| 6,098,644 A | 8/2000 | Ichinose | |
| 6,119,967 A | 9/2000 | Nakayama et al. | |
| 6,158,715 A | 12/2000 | Kirschbaum | |
| 6,565,064 B2 | 5/2003 | Smith et al. | |
| 6,662,705 B2 | 12/2003 | Huang et al. | |
| 6,901,729 B1 | 6/2005 | Otto et al. | |
| 7,142,967 B2 | 11/2006 | Brandt et al. | |
| 7,168,226 B2 | 1/2007 | McLean et al. | |
| 7,260,462 B2 | 8/2007 | Keim et al. | |
| 7,281,373 B2 | 10/2007 | Kim | |
| 7,406,982 B2 | 8/2008 | Pfaff et al. | |
| 7,430,954 B2 | 10/2008 | Miura et al. | |
| 8,001,751 B2 * | 8/2011 | Ehrhart et al. | 56/10.9 |
| 2003/0121409 A1 | 7/2003 | Lunzman et al. | |
| 2007/0193442 A1 | 8/2007 | McCoy, Jr. | |

* cited by examiner

*Primary Examiner* — Robert Pezzuto
(74) *Attorney, Agent, or Firm* — Patrick M. Sheldrake

(57) ABSTRACT

A control system is provided to control the rate of pressure rise in a hydraulic lift and flotation system. When a hydraulic cylinder of the hydraulic lift and flotation system is to be adjusted, the pressure in the hydraulic lift and flotation system has to be increased to a predetermined pressure controlled by a relief valve before the hydraulic cylinder can be operated. The unload valve of the hydraulic lift and flotation system can be closed in a controlled or regulated manner in order to control the rate at which pressure rises in the hydraulic lift and flotation system.

11 Claims, 3 Drawing Sheets

PRESSURE CONTROL SYSTEM FOR A HYDRAULIC LIFT AND FLOTATION SYSTEM

BACKGROUND

The present application relates generally to hydraulic systems. The present application relates more specifically to controlling the pressure rise rate in a hydraulic lift and flotation system.

Harvesting machines can use hydraulic lift and flotation systems to permit their headers to ride lightly up and over rises in the terrain during field operation. Hydraulic lift and flotation systems can include a pump, relief valve and unloading valve to supply and regulate hydraulic fluid flow. The unloading valve is a solenoid operated single direction check valve that is closed to block the oil flow path from the pump in order to build pressure in the system before forcing the oil through the relief valve. The pressure between the unloading valve and the relief valve is the system pressure used for the lift and flotation functions.

In current hydraulic lift and flotation systems, a fixed voltage signal is used to close the unloading valve. Depending on the normal state of the unloading valve, the voltage signal is either applied or removed to close the unloading valve. The unloading valve can close rapidly, which results in the pressure at the pump rising to to a magnitude greater than the relief pressure (the pressure necessary to open the relief valve) in a very short amount of time. The relief valve has a response rate that is incapable of reacting quickly enough to absolutely clamp pressure at its relief setting. The rapid uncontrolled/unregulated rise in pressure can cause damage to the pump and reduce the life of the valves, e.g., the relief valve, the unloading valve, and other components in the system.

Therefore, what is needed is a control system that can regulate the rate of pressure rise or increase in a hydraulic lift and flotation system to avoid damage to the system components.

SUMMARY

The present application relates to a hydraulic lift and flotation system. The hydraulic lift and flotation system includes a hydraulic cylinder to provide lift and flotation functionality for a machine, a pump to circulate a hydraulic fluid in the hydraulic lift and flotation system, a relief valve in fluid communication with the pump, and an unload valve in fluid communication with the pump. The relief valve provides general pressure regulation in the hydraulic lift and flotation system. The unload valve controls pressurization in the hydraulic lift and flotation system. The hydraulic lift and flotation system also includes a solenoid configured and positioned to control opening and closing of the unload valve. The unload valve is in fluid communication with the pump, and a controller. The controller is configured to execute a control algorithm to provide control instructions to the solenoid to control the unload valve. The control instructions operate the solenoid to close the unload valve over a period of time to control a rate of pressure rise in the hydraulic lift and flotation system until a predetermined pressure is obtained.

The present application further relates to a method of controlling pressure rise rates in a hydraulic lift and flotation system. The method includes providing a hydraulic lift and flotation system including a pump, a hydraulic cylinder, a first valve, a second valve and a fluid reservoir. The first valve is positioned to control fluid flow at the hydraulic cylinder. The method further includes operating the hydraulic lift and flotation system with the second valve in an open position to permit fluid to flow from the reservoir to the pump through the second valve and back to the reservoir, receiving a command to operate the hydraulic cylinder, and selecting a control algorithm configured to close the second valve. The closing of the second valve prevents return flow of fluid to the reservoir and builds pressure in the hydraulic lift and flotation system. The method includes applying control signals to the second valve with the control algorithm until the second valve is in a closed position. Each control signal is configured to close the second valve a predetermined amount and the closing of the second valve by a predetermined amount controls the rate of pressure rise in the hydraulic lift and flotation system.

The present application additionally relates to a harvesting machine. The harvesting machine includes a tractor adapted for movement over the ground. The tractor includes a frame having a front end and an opposing rear end. The harvesting machine also includes an elongate header having a first end and a second opposing end, a header lift and flotation system interconnecting the header and the frame for selectively raising and lowering the header relative to the ground and setting flotation parameters, and a hydraulic fluid reservoir. The first and second ends of the header define a length of the elongate header and the header is supported at the front end of the frame by first and second support points located intermediate the first and second ends. The header lift and flotation system includes left and right hand hydraulic cylinders interconnecting the frame and the header adjacent the respective first and second support points. The harvesting machine further includes substantially independent left and right hand electro-hydraulic circuits. Each electro-hydraulic circuit interconnecting the hydraulic fluid reservoir and the corresponding hydraulic cylinder. Each electro-hydraulic circuit includes a hydraulic pump, a valve in fluid communication with the hydraulic pump, and a controller. The valve is adjustable between a closed position and an open position. The controller is configured to execute a control algorithm to provide control instructions to the valve to adjust the position of the valve. The control instructions provided to the valve operating to close the valve over a period of time to control a rate of pressure rise in the header lift and flotation system.

One advantage of the present application is increased flexibility in fine tuning the pressure rise rate of the hydraulic lift and flotation system.

Another advantage of the present application is prior to the present application, the pressure rise rates could only be optimized with mechanical adjustments and for only one operating condition.

Other features and advantages of the present application will be apparent from the following more detailed description of the exemplary embodiments, taken in conjunction with the accompanying drawings.

DETAILED DESCRIPTION OF THE EXEMPLARY EMBODIMENTS

Wherever possible, the same reference numbers will be used throughout the drawings to refer to the same or like parts.

Figure 1:
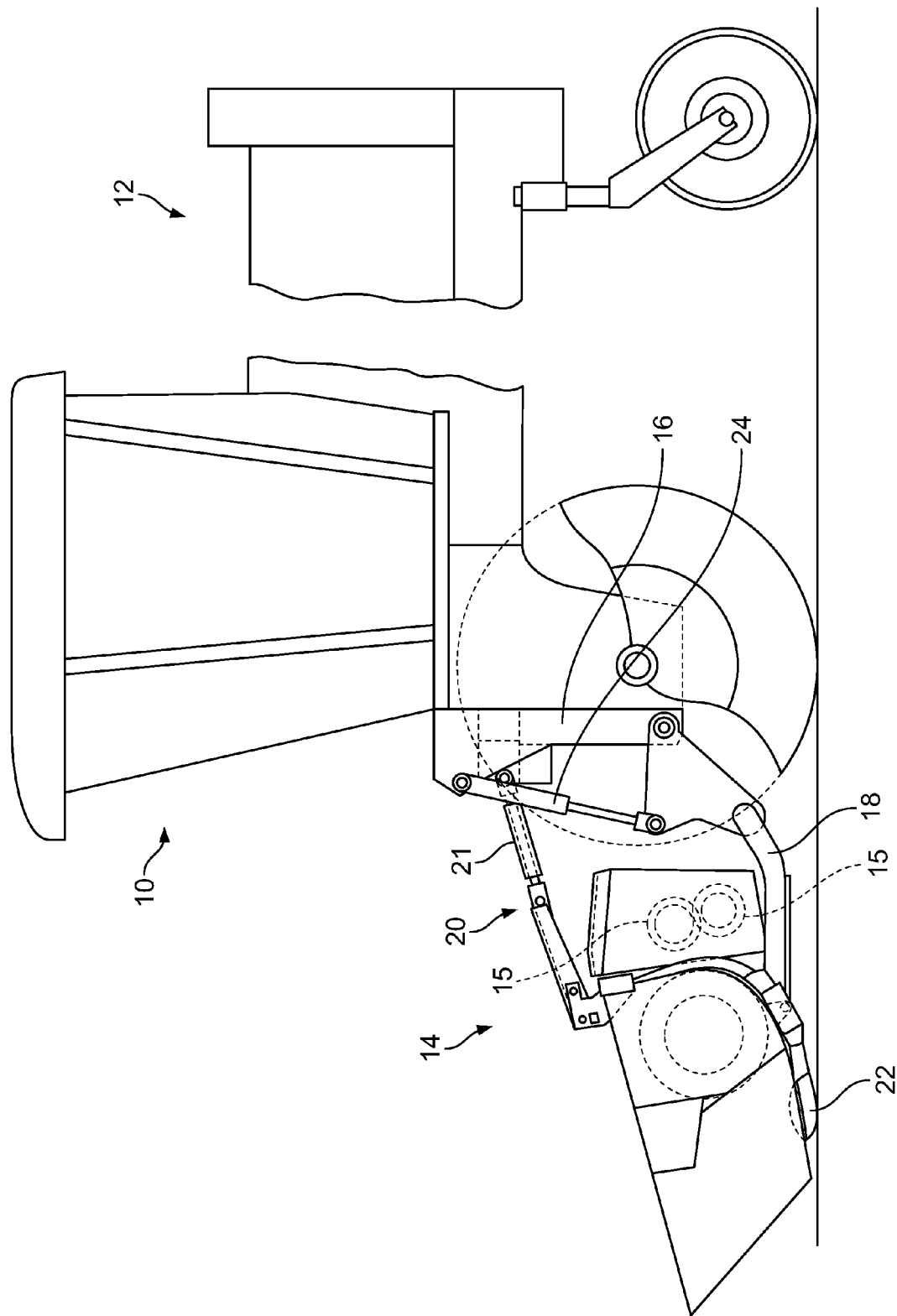
FIG. 1 shows a partial side elevational view of a crop harvesting machine with a simplified side view of an exemplary embodiment of a hydraulic lift and flotation system.

FIG. 1 shows a self-propelled windrower 10 with an exemplary embodiment of a hydraulic lift and flotation system. The control system of the present application can be used with any machine having a hydraulic lift and flotation system and is not limited to use with a self-propelled windrower, or any specific type of harvesting machine. The self-propelled windrower 10 has a tractor 12 and a header 14. The header 14 is attached to the front end of a frame 16 or chassis of the tractor 12. The header 14 may be of any suitable construction and design, and may include not only crop-harvesting mechanisms, but also crop conditioners such as elongate rolls 15. The attachment of the header 14 to the frame 16 can be achieved through a pair of lower arms 18 (only one arm is shown in FIG. 1) pivotally connected to the frame 16 at one end and to the header 14 at the other end. In addition, the header 14 can be attached to the frame by a central upper link 20. The link 20 may take the form of a single double-acting hydraulic cylinder 21 whose extension and retraction is controlled by the operator to remotely control the angle of sickle bar 22 on the lower front of the header 14.

A pair of lift/flotation cylinders 24 (only one lift/flotation cylinder is shown in FIG. 1) can interconnect the lower arm 18 and the frame 16 to provide support to the header 14, i.e., each side of the header 14 is supported by a lift/flotation cylinder 24. In another exemplary embodiment, each side of the header can have two or more lift/flotation cylinders to support the header 14.

The control system for the hydraulic lift and flotation system can be used to provide control functions for each of the lift/flotation cylinders 24. The control system can control each of the lift/flotation cylinders 24 through a corresponding subsystem that can be separate from the subsystems for other lift/flotation cylinders. Alternatively, the control system can control the lift/flotation cylinders 24 through a single centralized system that can share some operational components.

Figure 2:
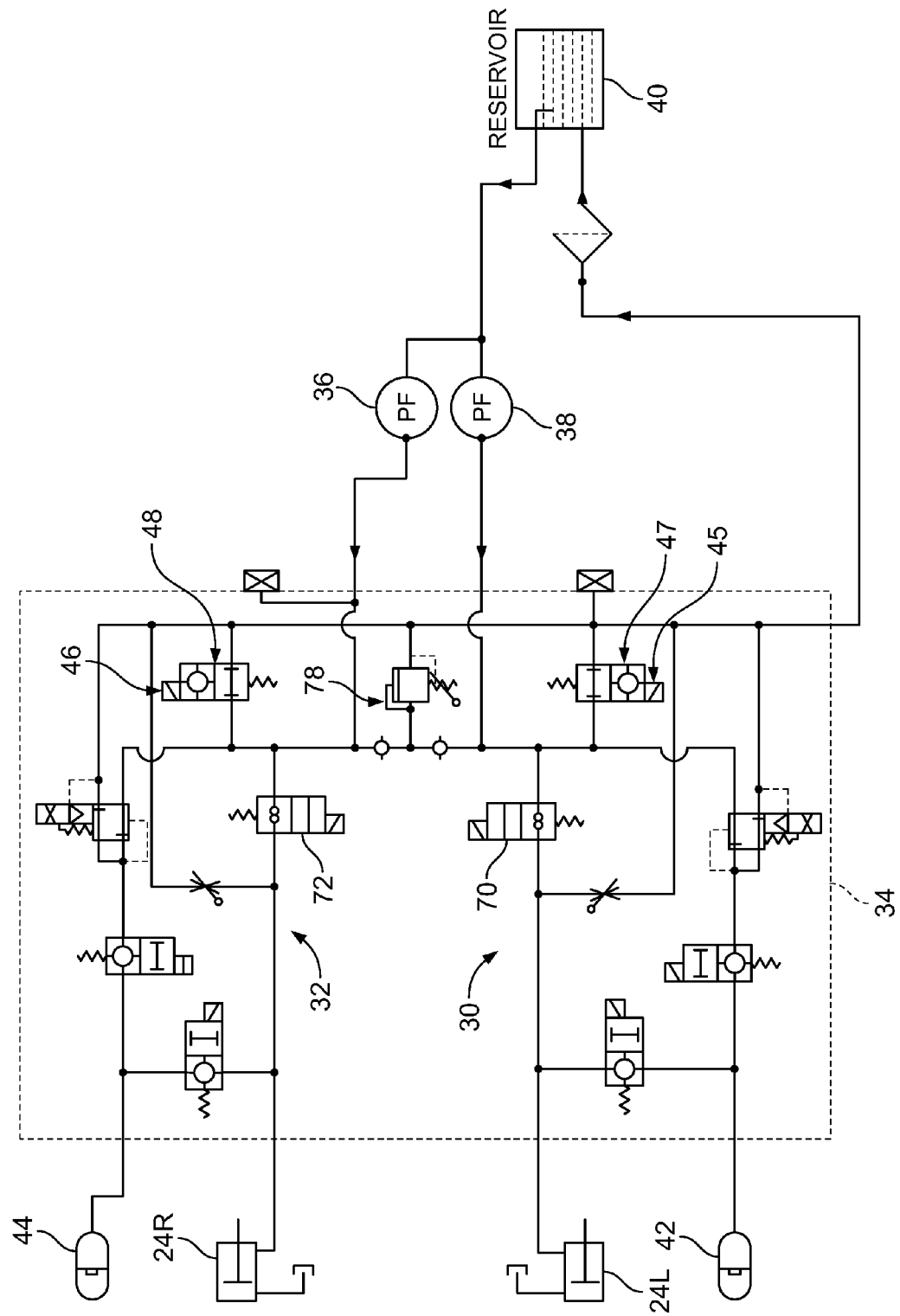
FIG. 2 schematically shows an exemplary embodiment of a hydraulic system for the hydraulic lift and flotation system of FIG. 1.

In FIG. 2, the hydraulic system for left lift/flotation cylinder 24L and right lift/flotation cylinder 24R can include two similar electro-hydraulic subsystems 30 and 32 controlled by the control system. In an exemplary embodiment, the majority of the components in the hydraulic lift and flotation system can be housed in a single enclosure 34 with appropriately located ports and other necessary connection devices and fixtures, for convenience of assembly and operation. A pair of fixed displacement or gear pumps 36, 38 move the hydraulic fluid from reservoir 40 into respective subsystems 30, 32. The subsystems 30, 32 can then circulate the hydraulic fluid through various circuits, as directed by corresponding control valves, to provide hydraulic fluid to accumulators 42, 44 and to hydraulic lift/flotation cylinders 24L, 24R, before returning the hydraulic fluid to reservoir 40.

Figure 3:
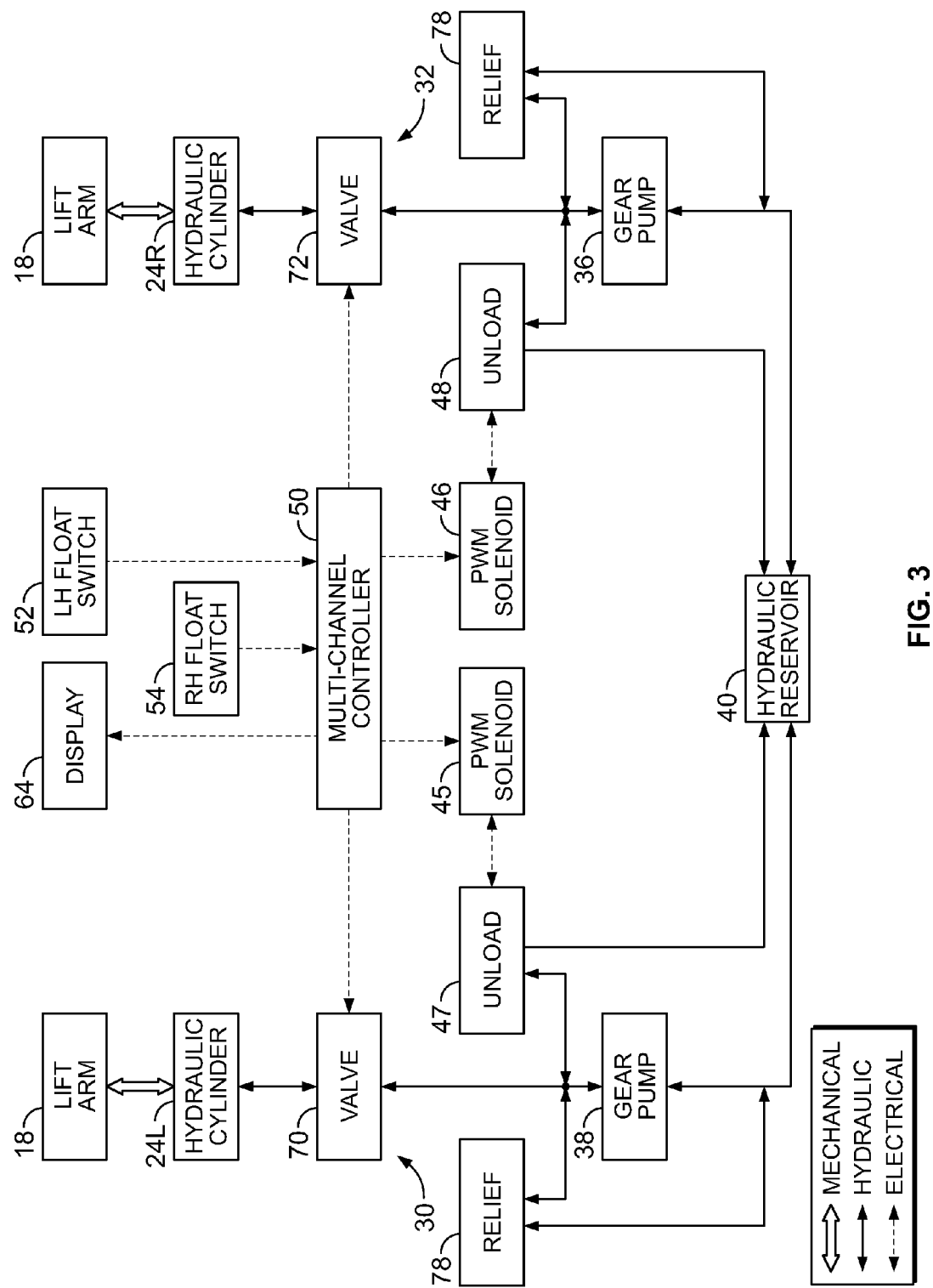
FIG. 3 schematically shows an exemplary embodiment of hydraulic, mechanical and electrical sub-systems for the hydraulic lift and flotation system of FIGS. 1 and 2.

In FIG. 3, the hydraulic, mechanical and electrical subsystems for the hydraulic lift and flotation system are shown. The left hand ("LH") hydraulic subsystem 30 and the right hand ("RH") hydraulic subsystem 32 are shown with some of the electrical control and mechanical subsystems. The control system can include a multi-channel programmable controller 50 or other suitable type of microprocessor that can execute a control algorithm and provide control instructions or signals to the components of the hydraulic lift and flotation system. The controller 50 can provide control signals to a LH float switch 52, a RH float switch 54, a PWM (pulse width modulated) solenoid 45 for unload valve 47, a PWM solenoid 46 for unload valve 48, and other valves in the hydraulic lift and flotation system to manage the lift and flotation functions as established by the operator through the appropriate switches and as shown on display 64.

In an exemplary embodiment, valves 70, 72, controlled by controller 50, can be used to control the flow of hydraulic fluid into hydraulic lift/flotation cylinders 24. In another exemplary embodiment, valves 70, 72, controlled by controller 50, can be used to control the flow of hydraulic fluid into and out of hydraulic lift/flotation cylinders 24. When hydraulic fluid is to flow into hydraulic lift/flotation cylinders 24, the hydraulic system upstream of valves 70, 72 has to be pressurized to a preselected pressure before valves 70, 72 can be opened to permit hydraulic fluid to flow into the hydraulic lift/flotation cylinders 24. To pressurize the system, pumps 36, 38 are operated to supply pressurized fluid into the upstream part of the system and the unload valves 47, 48 are closed in a controlled or regulated manner by the PWM solenoids 45, 46, which solenoids are controlled by the controller 50, to gradually build pressure in the upstream part of the system before reaching a preselected pressure, which preselected pressure corresponds to the relief pressure that opens relief valves 78. Once open, the relief valves 78 permits some of the hydraulic fluid to return to the reservoir 40 for recirculation while maintaining the desired pressure in the upstream part of the system. Alternatively, there may be one or more relief valves in the system.

The controller 50 can apply a control signal, e.g., a current signal or a voltage signal, to each of the PWM solenoids 45, 46 to close the corresponding unload valves 47, 48 by an amount corresponding to the control signal. In an exemplary embodiment, the controller 50 can apply proportional current signals, i.e., current signals that are related to the maximum current signal to be applied by the controller, to the PWM solenoids 45, 46 to close the unload valves 47, 48 at a rate slower than the rate the valve would close at when the maximum current signal is applied. In another exemplary embodiment, a proportional voltage signal can be applied to the PWM solenoids 45, 46 to close the unload valves 47, 48 at a slower rate.

The controller 50 can execute a control algorithm to apply a pulse width modulated current signal varying from 0 to about 1.2 A (amperes) or 1.5 A. By varying the current signal within the designated range, the controller 50 can provide almost infinitely variable control of the closing of unload valves 47, 48 to control the rate of pressure rise in the upstream part of the system. For example, in a linear system, applying a 0.6 A current signal to a solenoid having a 1.2 A maximum current signal would close the valve 50% because half of the maximum current signal was applied to the solenoid. However, in non-linear systems, proportionality between current signal values and valve opening percentages may be different.

The current profile applied to the solenoids 45, 46 of unload valves 47, 48 is a result of the control software or algorithm(s) that can be integrated into the operating system for the machine. By adjusting the current profile, the pressure rise rates can be adjusted for the particular situation. A current profile (or control algorithm) can be modified by editing the software source code to generate a modified profile (or algorithm) that replaces the existing profile (or algorithm) or to provide a new profile (or algorithm) that can be integrated into the operating system in addition to the existing profile (or algorithm). Since the current profiles (or control algorithms)

are integrated into the operating system, several different profiles (or algorithms) can be utilized depending on the operating situation.

In an exemplary embodiment, the controller 50 can execute a control algorithm to close the unload valves 47, 48 by providing a first control signal at a predetermined percentage of the maximum control signal for a first predetermined period of time. The predetermined percentage can be between about 20% to about 60% and the predetermined period of time can be between about 1 ms and about 30 milliseconds (ms). In one embodiment, the predetermined percentage is 50%. After the first predetermined period of time has expired, the controller 50 can provide increasing control signals (in percentage) at a predetermined rate until the unload valves 47, 48 are closed.

In another exemplary embodiment, the controller 50 can execute a control algorithm to close the unload valves 47, 48 in a stepped manner, i.e., close the unload valves 47, 48 a predetermined percentage at a predetermined interval until the unload valves 47, 48 are closed. In one embodiment, the controller 50 can provide control signals that close the unload valves 47, 48 within about 70 ms by closing the valve about 12.5% at 10 ms intervals.

In a further exemplary embodiment, the controller 50 can select and retrieve a control algorithm among several different control algorithms stored in a memory device to respond to particular operational conditions. By having multiple control algorithms from which to select, the controller 50 can select a control algorithm that is configured to provide a particular rate of pressure rise that appropriately responds to a particular situation, i.e., a particular set of valves and sequences that are operating at the time. For example, one control algorithm can be used in conjunction with a lift command for the hydraulic lift and flotation system and a second control algorithm can be used in conjunction with a lower command for the hydraulic lift and flotation system. In addition, other control algorithms can be developed and stored to accommodate other machines with hydraulic lift and flotation systems that use similar unload valves, but which may use different displacement pumps or relief valves (or settings).

The control algorithms executed by the controller 50 can be based on the corresponding flow rates through the unload valves 47, 48. At low flow rates, a small residual current can be applied to the unload valves 47, 48, while the unload valves are in the off state (open position). Applying a low current to the unload valves 47, 48 during the off state changes the response characteristics of the unload valves 47, 48 (by partially closing the valves) and provides for further optimization of the pressure rise rate. For example, since there is a large difference in flow rate through the unload valves 47, 48 at low and high engine speeds, the controller 50 can vary the current profile (or control algorithm) based on engine speed of the machine. At engine speeds below a specified threshold, the controller 50 can apply a small residual current on solenoid 45, 46 of the respective unload valves 47, 48 to increase the response time for reaching the predetermined pressure. At engine speeds above the threshold, a current profile (or control algorithm) is selected where the current is completely off to the unload valves 47, 48 in the normal state (open position), to facilitate a more gradual pressure rise. However, when deenergizing the unload valves 47, 48, i.e., opening the valves, such as at a lower flow rate, the unload valves 47, 48 may receive a partially energized control signal to keep the unload valves freely opened, yet partially energized, if the engine RPM (revolutions per minute) is less than the threshold.

In other exemplary embodiments, one or more of the stored control algorithms can be modified to include one or more of the following features. First, a delay timer can be set for a delay in response to a header raise operation being stopped and the hydraulic oil temp being cold, i.e., being below a predetermined temperature, or a quick raise operation was performed that caused the pressure to go over the relief pressure. Next, a 20 ms delay can be provided after the control algorithm reaches 100%, i.e., the unload valves 47, 48 are closed, before energizing the header raise or tilt retract solenoid. Further, if the operator releases the header raise switch and quickly presses the header raise switch again, a 40 ms delay (extended from 20 ms) can be provided before energizing the header raise or tilt retract solenoid.

In an exemplary embodiment, each side of the header 14 can be supported by a single hydraulic lift/flotation cylinder 24 that can perform both the flotation and lift functions. For even lifting and flotation of an unbalanced header, each hydraulic lift/flotation cylinder 24 has a corresponding control valve, pump, and accumulator. The operator sets the desired flotation force by actuating rocker or float switches 52, 54 located on the operator's console. One switch position of the rocker or float switches 52, 54 permits hydraulic oil to enter an accumulator (increasing the hydraulic pressure in the accumulator) which reduces the header contact force (flotation) with the ground. The other position of the rocker or float switches 52, 54 permits oil to exit that accumulator (reducing the hydraulic pressure in the accumulator) which increases the header contact force with the ground. To evenly float unbalanced headers, there are separate switches to adjust each side independently. Once the flotation forces are set, the control valves will return to this preset flotation condition whenever the float mode is selected, irrespective of subsequent header lift and lower operations.

In an exemplary embodiment, the unload valves 47, 48 are positioned in the open position permit the hydraulic fluid to return to the reservoir 40 for recirculation and prevent any pressure build-up in the upstream part of the system in response to the hydraulic lift and flotation system maintaining its current operational state.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A hydraulic lift and flotation system comprising:
a hydraulic cylinder to provide lift and flotation functionality for a machine;
a pump to circulate a hydraulic fluid in the hydraulic lift and flotation system;
a relief valve in fluid communication with the pump, the relief valve providing general pressure regulation in the hydraulic lift and flotation system;
an unload valve in fluid communication with the pump and a controller, the unload valve controlling pressurization in the hydraulic lift and flotation system;
a solenoid configured and positioned to control opening and closing of the unload valve;
the controller programmed to execute a control algorithm to provide control instructions to the solenoid to control the unload valve; and
the control instructions operating the solenoid to close the unload valve over a period of time to control a rate of pressure rise in the hydraulic lift and flotation system until a predetermined pressure is obtained.

2. The system of claim 1 wherein the control instructions are control signals and each control signal ranges from 0 to a maximum value corresponding to a fully moved position of the valve.

3. The system of claim 2 wherein the control signal is at least one of a current signal or a voltage signal.

4. The system of claim 3 wherein the control signal is a current signal and the maximum value is one of 1.2 amperes or 1.5 amperes.

5. The system of claim 2 wherein the control signal is a pulse width modulated signal.

6. The system of claim 2 wherein the control signal provided to the solenoid corresponds to a percentage of the maximum value and the solenoid is configured to close the unload valve an amount corresponding to the percentage of the maximum value of the control signal.

7. The system of claim 1 further comprising a memory device storing a plurality of control algorithms, each control algorithm of the plurality of control algorithms being configured to provide a different rate of pressure rise in the hydraulic lift and flotation system.

8. The system of claim 1 wherein the control instructions are configured to operate the unload valve and control the pressure rise rate based on the flow rate or on engine speed of an engine powering the pump.

9. The system of claim 7, wherein the controller is programmed to select a control algorithm from the plurality of control algorithms to corresponds to an operational state of the hydraulic lift and flotation system.

10. The system of claim 2, wherein the control instructions include at least two control signals having different values.

11. The system of claim 7, wherein the controller is programmed to use a first control algorithm in conjunction with a lift command and a second control algorithm in conjunction with a lower command.

* * * * *